United States Patent [19]

Whittingham et al.

[11] 4,233,375
[45] Nov. 11, 1980

[54] HIGH ENERGY DENSITY PLURAL CHALCOGENIDE CATHODE-CONTAINING CELL

[75] Inventors: M. Stanley Whittingham, Fanwood; Allan J. Jacobson, Princeton, both of N.J.

[73] Assignee: Exxon Research & Engineering Co., Florham Park, N.J.

[21] Appl. No.: 63,107

[22] Filed: Aug. 2, 1979

[51] Int. Cl.[3] .............................................. H01M 6/14
[52] U.S. Cl. ..................................... 429/194; 429/218
[58] Field of Search ......................... 429/218, 191, 194

[56] References Cited

U.S. PATENT DOCUMENTS

| | | | |
|---|---|---|---|
| 3,791,867 | 2/1974 | Broadhead et al. | 136/6 R |
| 3,992,222 | 11/1976 | Walsh et al. | 429/221 |
| 4,009,052 | 2/1977 | Whittingham | 429/191 |
| 4,066,824 | 1/1978 | Rao et al. | 429/191 X |
| 4,075,397 | 2/1978 | Francis et al. | 429/191 X |
| 4,118,549 | 10/1978 | Liang et al. | 429/191 |
| 4,144,384 | 3/1979 | Jacobson et al. | 429/218 |

*Primary Examiner*—Charles F. LeFevour
*Attorney, Agent, or Firm*—K. P. Glynn; R. S. Salzman

[57] ABSTRACT

The present invention is directed to electric current-producing cells having specified mixed cathodes. The cells comprise: (a) an anode having as its anode-active material one or more metals selected from the group consisting of the Periodic Table Group IA metals, Group IB metals, Group IIA metals and Group IIB metals; (b) a cathode having as its cathode-active material a mixture containing: (i) one or more cathode-active, high energy density chalcogenide compounds selected from the group consisting of $VS_a$, $VO_a$, $C_xS$, $MoO_z$ and $MoS_z$, wherein a is a numerical value of about 1.8 to about 2.7, wherein x is a numerical value of about 4 to about 16 and wherein z is a numerical value of about 2.5 to about 3.5; and (ii) one or more cathode-active, high rate chalcogenide compounds selected from the group consisting of $TiS_y$, $TiSe_y$ and $VSe_y$, wherein y is a numerical value of about 1.8 to about 2.2; and (c) an electrolyte which is chemically inert with respect to said anode and said cathode and which permits the migration of ions between said anode and said cathode. A preferred embodiment contains a lithium-active material anode and a cathode containing a mixture of $MoS_3$ and $TiS_2$.

31 Claims, 2 Drawing Figures

HIGH ENERGY DENSITY PLURAL CHALCOGENIDE CATHODE-CONTAINING CELL

BACKGROUND OF THE INVENTION AND PRIOR ART

1. Field of the Invention

The present invention is directed to electric current producing cells, and more particularly to such cells having high energy density cathodes containing a plurality of cathode-active chalcogenides.

2. Statement of Prior Art

High energy density batteries have been developed based on the use of alkali metal anodes, e.g., lithium and chalcogenide cathodes, e.g., $TiS_2$, as exemplified by U.S. Pat. No. 4,009,052 to Whittingham. In addition, recent patents suggest the use of mixed cathodes for advantageous results wherein the chalcogenide is combined with other active material. For example, U.S. Pat. No. 3,791,867 suggests the use of transition metal chalcogenides as hosts for cathode-active materials such as chalcogens and halogens, e.g., sulfur, selenium, tellurium, bromine and iodine.

More recently, in U.S. Pat. No. 4,118,549, it has been suggested that high energy density materials such as metal and carbon fluorides and some metal oxides may be used in cathodes with a layer of high ionic conductivity such as $TiS_2$. Exemplary fluorides are $PbF_2$ and $(CF)_n$. It was recently disclosed that Mallory U.S. patent application Ser. No. 790,724 (Apr. 25, 1977) describes mixed cathode systems employing a non-conducting chalcogenide, e.g., $As_2S_3$, $Sb_2S_3$, $Sb_2S_5$ or $SeS_2$, with a highly conductive chalcogenide such as $TiS_2$ (only Abstract copy available); and Mallory U.S. patent application Ser. No. 790,800 (Apr. 25, 1977) describes mixed cathodes having chalcogenides such as $TiS_2$ and other active materials such as S, Se, Te, Br and/or I. Additionally, it has been well publicized in the nonaqueous electrolyte literature that cathode materials which may be used in conjunction therewith include typically primary cell chalcogenides, e.g., $FeS_2$, or typically secondary chalcogenides, e.g., $TiS_2$.

Lastly, U.S. Pat. No. 3,992,222 describes mixed cathode cells having alkali metal anodes wherein the mixed cathodes contain $FeS_2$ and a sulfide of a polyvalent metal. However, this patent is directed to high temperature batteries and, furthermore, nowhere anticipates or suggests any cathode-active material combination of the present invention.

Notwithstanding the prior art which is replete with examples of mixed cathode systems having two or more active materials including $TiS_2$, no prior art teaches or renders obvious the present invention which involves a high energy density cathode system containing a plurality of selected chalcogenide materials more fully developed below.

SUMMARY OF THE INVENTION

The present invention is directed to an electric current-producing cell which includes: (a) an anode having as its anode-active material one or more metals selected from the group consisting of the Periodic Table Group IA metals, Group IB metals, Group IIA metals and Group IIB metals; (b) a cathode having as its cathode-active material, a mixture containing: (i) one or more cathode-active, high energy density chalcogenide compounds selected from the group consisting of $VS_a$, $VO_a$, $C_xS$, $MoO_z$ and $MoS_z$ wherein a is a numerical value of about 1.8 to about 2.7, wherein x is a numerical value of about 4 to about 16 and wherein z is a numerical value of about 2.5 to about 3.5; and (ii) one or more cathode-active, high rate, high conductivity chalcogenide compounds selected from the group consisting of $TiS_y$, $TiSe_y$ and $VSe_y$, wherein y is a numerical value of about 1.8 to about 2.2; and (c) an electrolyte which is chemically inert with respect to said anode and said cathode and which permits the migration of ions between said anode and said cathode.

DETAILED DESCRIPTION OF THE INVENTION AND DRAWINGS

Figure 1:
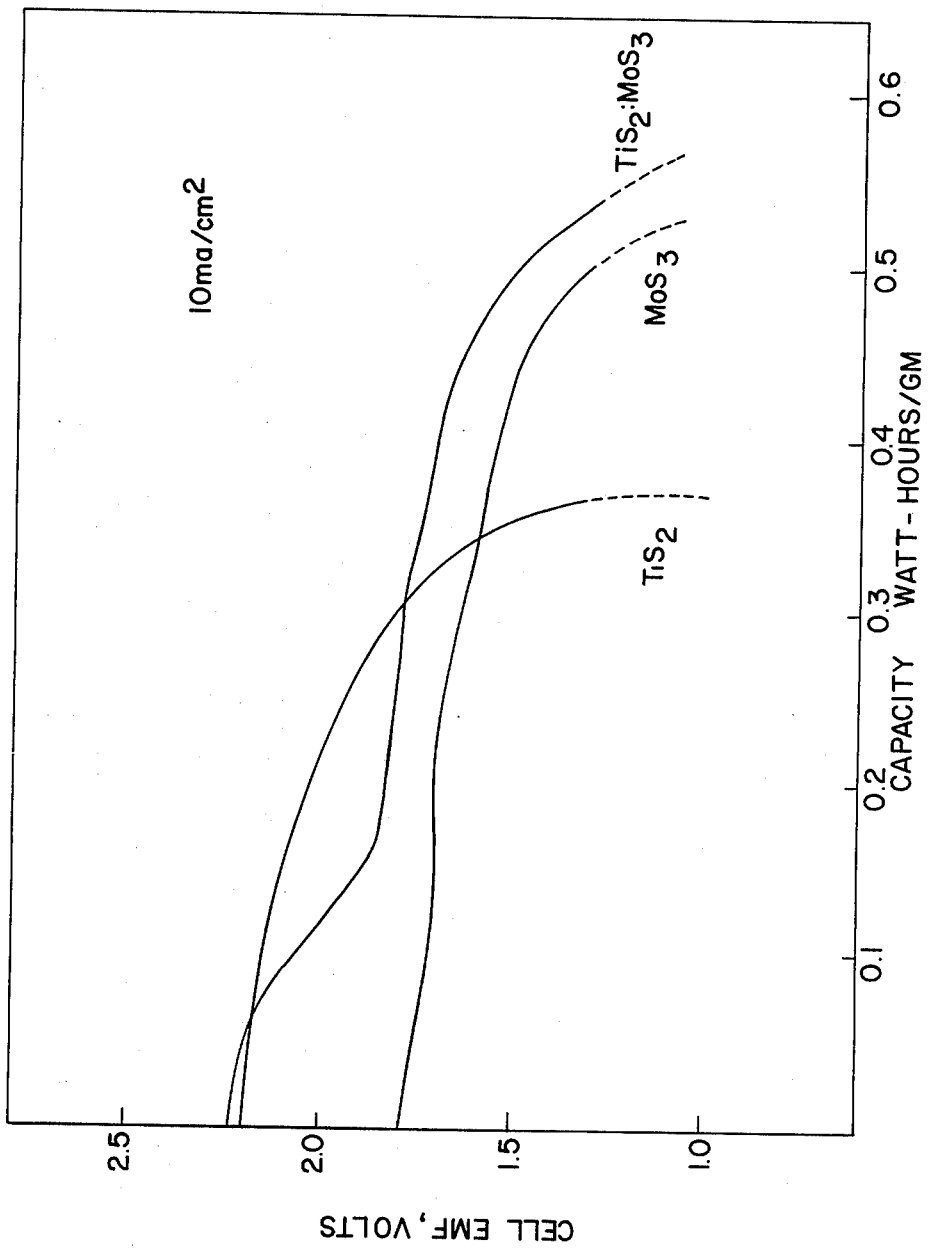
FIG. 1 illustrates curves showing capacity vs. cell voltage for cells having $TiS_2$, having $MoS_3$ and having $TiS_2$: $MoS_3$ cathodes.

As mentioned, the electric current-producing cell of the present invention is one which contains a specified anode, a functional electrolyte, and a cathode having as its cathode-active material a plurality of cathode-active chalcogenides, at least one being selected from a specified group of high energy density chalcogenides and at least one being selected from a specified group of high rate chalcogenides. Thus, it has been discovered that improved cycling performance may be obtained while maintaining high energy density in a cell by combining relatively low rate, high energy density chalcogenides with high (and possibly high energy density) chalcogenides for the cathode-active materials. By this combination of specified cathode-active materials, the unexpected results of the present invention are obtained.

In general, the anode employed in the cell of the present invention is one which contains as its anode-active material one or more metals selected from the group consisting of the Periodic Table Group IA metals. Of these Group IA metals, also known as the alkali metals, lithium and sodium are desirable. Preferred is the anode having lithium as its anode-active material. It should be noted that the alkali metals used in the anodes are meant to include both pure alkali metals and alloys containing these, e.g., lithium-aluminum alloys. The anode-active material may be in contact with other metal structures in the cell of the present invention, as desired. Thus, the anode-active materials, e.g., lithium, may be in contact with metal structures such as nickel, copper or silver screen, which serve as current collectors. These anode configurations are a matter of design and are well known in the art.

The cathode employed in the cell of the present invention is one which has as its cathode-active material, a mixture containing:

(i) one or more cathode-active, high energy density chalcogenide compounds selected from the group consisting of $VS_a$, $VO_a$, partially substituted analogs of $VS_a$, $C_xS$, $MoO_z$, and $MoS_z$, wherein a is a numerical value of about 1.8 to about 2.7, wherein x is a numerical value of about 4 to about 16 and wherein z is a numerical value of about 2.5 to about 3.5; and, (ii) one or more cathode-active, high rate, high conductivity chalcogenide compounds selected from the group consisting of $TiS_y$, $TiSe_y$ and $VSe_y$, wherein y is a numerical value of about 1.8 to about 2.2.

The (low rate) high energy density chalcogenide component is one or more of the compounds specified and is desirably that group of compounds wherein a is a numerical value of about 2.0 to about 2.5, wherein x is about 4 to about 16, and preferably wherein x is about 4 to about 10. Also preferable are the following compounds:

$C_xS$, wherein x is as defined,
$VS_{2.5}$ (also known as $V_2S_5$),
$VS_2$,
$V_{1-b}Fe_bS_2$, wherein $b \leq 0.5$,
$VO_{2.5}$ (also known as $V_2O_5$),
$VO_{2.13}$ (also known as $V_6O_{13}$),
$MoS_3$, and
$MoO_3$.

The high rate (high energy density), high conductivity chalcogenide component is one or more of the specified compounds and is desirably that group of compounds wherein y is about 1.8 to about 2.05. Also preferable are the following compounds:

$TiS_2$,
$TiSe_2$, and
$VSe_2$.

The foregoing cathode-active high energy density and high rate chalcogenides are now well known in the art and methods of making such compounds are within the purview of the artisan. As to the $C_xS$ compounds specifically, these are the subject of recently issued U.S. Pat. No. 4,143,214.

In general, any relative amounts of the specified high energy density chalcogenides and the specified high rate chalcogenide may be employed and desirably about 10% to about 90% by weight of the high rate chalcogenides should be employed based on the total weight of the cathode-active materials.

Advantageously, the cathode-active materials used in the cells of the present invention may simply be hot pressed into a cathode structure, with or without supporting materials. The cathode-active material may be supported on structures such as carbon, copper, nickel, stainless steel, iron, etc., and it may be supported on such materials or it may be impregnated into such materials. In one preferred embodiment, the cathode does not contain any conductive diluents within the cathode-active material, such as carbon. However, plastic binding agents such as polyfluoroethylene may be utilized if desired.

The electrolyte used in the cell of the present invention is any electrolyte which is chemically inert with respect to the anode and with respect to the cathode, and which permits the migration of ions between the anode and the cathode. The electrolyte may typically be a nonaqueous alkali metal salt-organic solvent electrolyte solution. These alkali metal salts are well known in the art and need not be enumerated herein. However, such salts include the lithium and sodium salt complexes which are dissolved in organic solvents such as inertly substituted and unsubstituted ethers, and organic carbonates and esters. Preferred electrolytes for use in conjunction with cells containing lithium as its cathode-active material are cyclic ethers. One preferred system comprises a cell having an electrolyte-containing lithium perchlorate salt dissolved in dioxolane or a dioxolane-containing solution. Alternatively, the electrolyte may be a solid such as beta-alumina or an alkali metal halide, or a molten salt.

The electric current-producing cells of the present invention containing the above-mentioned anodes, cathodes and electrolytes not only have high energy densities, but are also capable of being cycled through charging and discharging, and may be readily produced on a large-scale basis.

The present invention is illustrated by the following examples, but the invention should not be construed by being limited thereto.

EXAMPLE 1

A cathode of titanium disulfide was constructed by hot pressing $TiS_2$ powder at about 300° C. into a metal screen; 10% teflon was used as a binder. This cathode was then surrounded by polypropylene separators and a sheet of lithium metal, and immersed in a solution of lithium perchlorate in dioxolane. This cell was then discharged and charged at currents of 20 ma and 4 ma respectively; the current was passed in a pulsed mode, 20 seconds on followed by 20 seconds off. The capacity on the first discharge was about 0.8 kcoul/gm to a 1 volt cut-off. This cell was cycled more than fifty times.

EXAMPLE 2

A cathode was prepared by hot-pressing ammonium thiomolybdate in the same manner as described in Example 1. The cycling was performed also as in Example 1. The capacity on the first discharge was 1.29 kcoul/gram. This dropped to 0.72 on the second and 0.37 kcoul/gm on the seventh discharge. Cycling was continued for 14 cycles when the capacity was 0.10 kcoul/gm.

EXAMPLE 3

A cathode was constructed by hot-pressing ammonium thiomolybdate (70% by weight), titanium disulfide (27%) and teflon (3%) into a metal grid. Cycling was performed as in the above examples. The first cycle capacity was 1.24 kcoul/gm. On the second cycle 1.02 was still retained, and 0.73 kcoul/gm on the seventh cycle. The cell was cycled fifteen times, when the capacity was 0.35 kcoul/gm substantially higher than that of Example 2. FIG. 1 compares the capacity on the first discharge of Examples 1, 2 and 3. It clearly shows the synergistic effect of the mixed system. The differences become even more enhanced in the later discharges, as illustrated.

EXAMPLE 4

Figure 2:
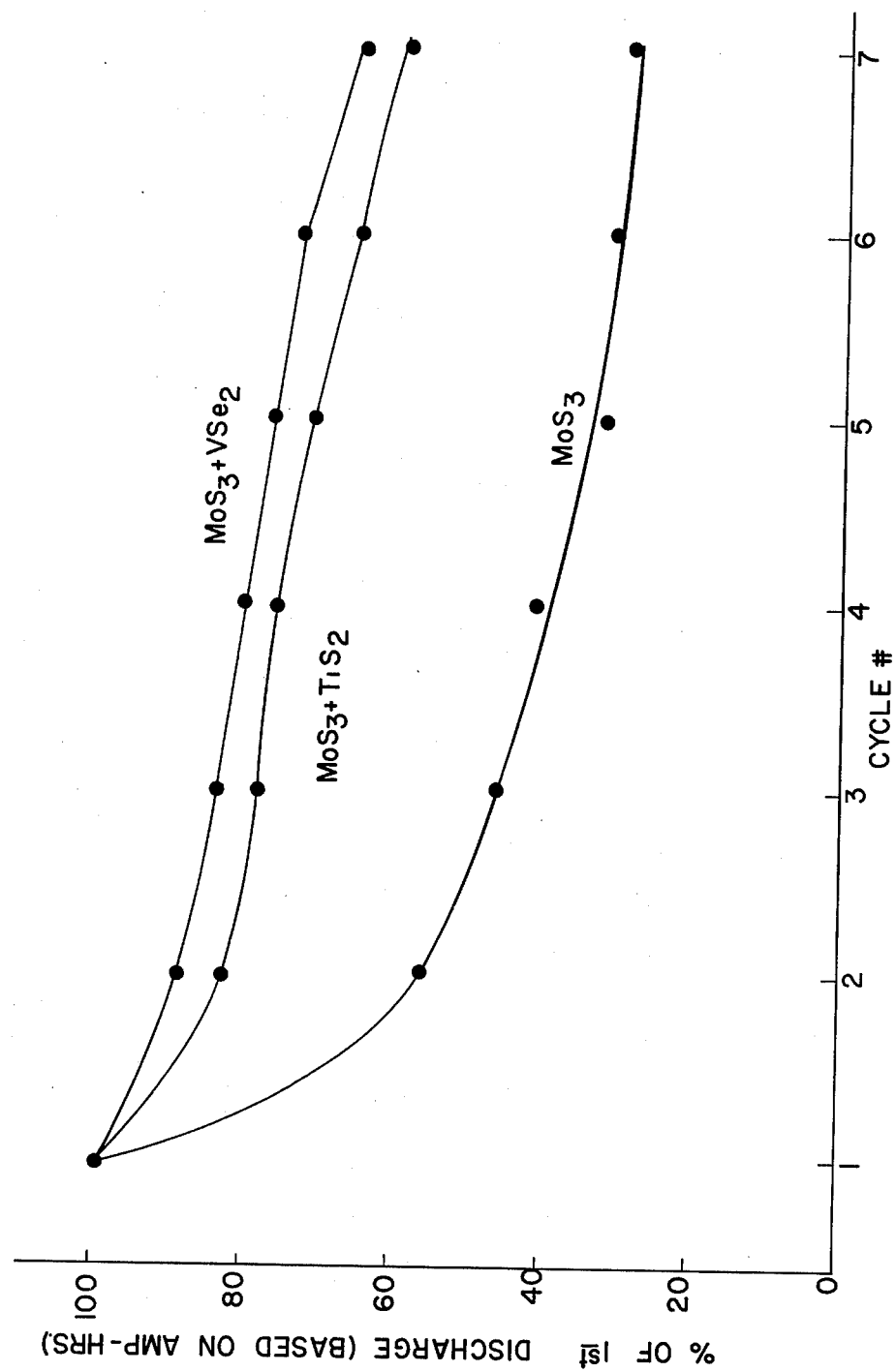
FIG. 2 illustrates curves showing cycle number vs. percent of first discharge based on amp-hours for cells having $MoS_3$, having $MoS_3$ with $TiS_2$ and having $MoS_3$ with $VSe_2$ cathodes.

A cell was constructed as in Example 3 except that vanadium diselenide was used in place of the titanium disulfide. The cell was discharged at 20 ma, the current was cycled on and off for 20 seconds on each half cycle. The capacity of the cell was 1.22 kcoul/gm. The cell was then recharged at 4 ma using the same pulse cycle. On the second discharge more than 85% of the first cycle capacity was obtained. This cycling was continued for seven cycles after which the discharge/charge cycles were performed under continuous currents of 10 ma and 2 ma respectively. The capacity in amp-hrs of this cell was significantly higher than that of a cell containing only the molybdenum compound. In FIG. 2, this data is compared with that of the $MoS_3$ cell and the mixed $TiS_2$:$MoS_3$ cell. The difference is even more marked when made on a Watt-hr basis due to the higher discharge voltage in the mixed metal system.

What is claimed is:

1. An electric current producing cell, comprising:

(a) an anode having as its anode-active material one or more metals selected from the group consisting of the Periodic Table Group IA metals, Group IB metals, Group IIA metals and Group IIB metals;

(b) a cathode having as its cathode-active material a mixture containing:

(i) one or more cathode-active, high energy density chalcogenide compounds selected from the group consisting of $VS_a$, $VO_a$, partially substituted analogs of $VS_a$, $C_xS$, $MoO_z$ and $MoS_z$, wherein a is a numerical value of about 1.8 to about 2.7, wherein x is a numerical value of about 4 to about 16, wherein z is a numerical value of about 2.5 to about 3.5; and (ii) one or more cathode-active, high rate, high conductivity chalcogenide compounds selected from the group consisting of $TiS_y$, $TiSe_y$ and $VSe_y$, wherein y is numerical value of about 1.8 to about 2.2; and (c) an electrolyte which is chemically inert with respect to said anode and said cathode and which permits the migration of ions between said anode and said cathode.

2. The cell of claim 1 wherein said anode has as its anode-active material one or more metals selected from Group IA.

3. The cell of claim 2, wherein said high rate, high conductivity chalcogenide compounds are selected from the group consisting of $TiS_2$, $VSe_2$, and $TiSe_2$.

4. The cell of claim 2, wherein said anode-active material is lithium.

5. The cell of claim 2, wherein said high rate chalcogenide compound is $TiS_2$.

6. The cell of claim 1 wherein said variable a is about 2.0 to about 2.5.

7. The cell of claim 6, wherein said high rate, high conductivity chalcogenide compounds are selected from the group consisting of $TiS_2$, $VSe_2$, and $TiSe_2$.

8. The cell of claim 6, wherein said anode-active material is lithium.

9. The cell of claim 6, wherein said high rate chalcogenide compound is $TiS_2$.

10. The cell of claim 1 wherein said variable x is about 4 to about 10.

11. The cell of claim 10, wherein said high rate, high conductivity chalcogenide compounds are selected from the group consisting of $TiS_2$, $VSe_2$, and $TiSe_2$.

12. The cell of claim 10, wherein said anode-active material is lithium.

13. The cell of claim 10, wherein said high rate chalcogenide compound is $TiS_2$.

14. The cell of claim 1 wherein said variable y is about 1.8 to about 2.05.

15. The cell of claim 14, wherein said high rate, high conductivity chalcogenide compounds are selected from the group consisting of $TiS_2$, $VSe_2$, and $TiSe_2$.

16. The cell of claim 14, wherein said anode-active material is lithium.

17. The cell of claim 14, wherein said high rate chalcogenide compound is $TiS_2$.

18. The cell of claim 1 wherein said variable z is about 2.8 to about 3.2.

19. The cell of claim 18, wherein said high rate, high conductivity chalcogenide compounds are selected from the group consisting of $TiS_2$, $VSe_2$, and $TiSe_2$.

20. The cell of claim 18, wherein said anode-active material is lithium.

21. The cell of claim 18, wherein said high rate chalcogenide compound is $TiS_2$.

22. The cell of claim 1 wherein said high energy density chalcogenide compounds are selected from the group consisting of $VS_{2.5}$ (or $V_2S_5$), $VS_2$, $VO_{2.5}$ (or $V_2O_5$), $VO_{2.13}$ (or $V_6O_{13}$), $C_xS$, $MoS_3$ and $MoO_3$.

23. The cell of claim 22, wherein said high rate, high conductivity chalcogenide compounds are selected from the group consisting of $TiS_2$, $VSe_2$, and $TiSe_2$.

24. The cell of claim 22, wherein said anode-active material is lithium.

25. The cell of claim 22, wherein said high rate chalcogenide compound is $TiS_2$.

26. The cell of claim 1, wherein said high rate, high conductivity chalcogenide compounds are selected from the group consisting of $TiS_2$, $VSe_2$, and $TiSe_2$.

27. The cell of claim 1, wherein said anode-active material is lithium.

28. The cell of claim 1, wherein said high rate chalcogenide compound is $TiS_2$.

29. The cell of claim 1 wherein said anode-active material is lithium, said high energy density chalcogenide compound is $MoS_3$ and said high rate chalcogenide compound is $TiS_2$.

30. The cell of claim 1 wherein said anode-active material is lithium, said high energy density chalcogenide compound is $MoS_3$ and said high rate chalcogenide compound is $VSe_2$.

31. The cell of claim 29 or 30 wherein said electrolyte is a lithium salt dissolved in a cyclic ether.

* * * * *